United States Patent
Giri et al.

(10) Patent No.: US 11,198,923 B2
(45) Date of Patent: Dec. 14, 2021

(54) ALUMINUM BASED NANOGALVANIC COMPOSITIONS USEFUL FOR GENERATING HYDROGEN GAS AND LOW TEMPERATURE PROCESSING THEREOF

(71) Applicant: U.S. Army Research Laboratory, Adelphi, MD (US)

(72) Inventors: Anit K. Giri, Abingdon, MD (US); Anthony J. Roberts, Chesapeake City, MD (US); Billy C. Hornbuckle, Aberdeen, MD (US); Scott M. Grendahl, Newark, DE (US); Kristopher A. Darling, Havre de Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/042,632

(22) Filed: Jul. 23, 2018

(65) Prior Publication Data

US 2019/0024216 A1    Jan. 24, 2019

Related U.S. Application Data

(60) Provisional application No. 62/536,143, filed on Jul. 24, 2017.

(51) Int. Cl.
  *C22C 1/04*   (2006.01)
  *B22F 9/04*   (2006.01)
  (Continued)

(52) U.S. Cl.
  CPC ............ *C22C 1/0416* (2013.01); *B22F 9/04* (2013.01); *C01B 3/08* (2013.01); *B22F 1/0018* (2013.01);
  (Continued)

(58) Field of Classification Search
  CPC ................ C11C 1/0416; C01B 3/08
  (Continued)

(56) References Cited

U.S. PATENT DOCUMENTS

| | | | |
|---|---|---|---|
| 5,494,538 | A | 2/1996 | Kirillov et al. |
| 6,726,892 | B1 | 4/2004 | Au |

(Continued)

FOREIGN PATENT DOCUMENTS

| | | |
|---|---|---|
| CN | 101289163 A | 10/2008 |
| CN | 101798061 | 8/2010 |

(Continued)

OTHER PUBLICATIONS

"New process generates hydrogen from aluminum alloy to run engines, fuel cells" https://www.researchgate.net/publication/223479656_Aluminum_and_Aluminum_Alloys_as_Sources_of_Hydrogen_for_Fuel_Cell_Applications.

(Continued)

*Primary Examiner* — Douglas B Call
(74) *Attorney, Agent, or Firm* — Eric B. Compton; Christos S. Kyriakou

(57) ABSTRACT

Alloys comprised of a refined microstructure, ultrafine or nano scaled, that when reacted with water or any liquid containing water will spontaneously and rapidly produce hydrogen at ambient or elevated temperature are described. These metals, termed here as aluminum based nanogalvanic alloys will have applications that include but are not limited to energy generation on demand. The alloys may be composed of primarily aluminum and other metals e.g. tin bismuth, indium, gallium, lead, etc. and/or carbon, and mixtures and alloys thereof. The alloys may be processed by ball milling for the purpose of synthesizing powder feed stocks, in which each powder particle will have the above mentioned characteristics. These powders can be used in (Continued)

their inherent form or consolidated using commercially available techniques for the purpose of manufacturing useful functional components.

22 Claims, 13 Drawing Sheets

(51) Int. Cl.
```
C01B 3/08      (2006.01)
C22C 21/00     (2006.01)
C22C 21/08     (2006.01)
B22F 1/00      (2006.01)
```
(52) U.S. Cl.
CPC ....... *B22F 1/0044* (2013.01); *B22F 2009/043* (2013.01); *B22F 2998/10* (2013.01); *B22F 2999/00* (2013.01); *C22C 1/0483* (2013.01); *C22C 21/003* (2013.01); *C22C 21/08* (2013.01); *C22C 2200/04* (2013.01)

(58) Field of Classification Search
USPC .......................................................... 423/657
See application file for complete search history.

(56) References Cited

U.S. PATENT DOCUMENTS

| | | | |
|---|---|---|---|
| 7,441,717 B1 | 10/2008 | Majka et al. | |
| 7,837,976 B2 | 11/2010 | Sandrock et al. | |
| 7,938,879 B2 | 5/2011 | Woodall et al. | |
| 8,080,233 B2 | 12/2011 | Woodall et al. | |
| 9,011,572 B1 | 4/2015 | Bunker et al. | |
| 9,061,261 B2 | 6/2015 | Fullerton | |
| 10,384,937 B2 | 8/2019 | Bunker et al. | |
| 2002/0048548 A1 | 4/2002 | Chaklader | |
| 2007/0199410 A1 | 8/2007 | Scholl | |
| 2013/0181175 A1* | 7/2013 | Lu | H01B 1/08 |
| | | | 252/519.5 |
| 2013/0299185 A1 | 11/2013 | Xu et al. | |
| 2015/0360941 A1 | 12/2015 | Macrae | |
| 2016/0059214 A1 | 3/2016 | Helton | |
| 2020/0189911 A1 | 6/2020 | Koehler et al. | |

FOREIGN PATENT DOCUMENTS

| | | |
|---|---|---|
| CN | 102009950 | 4/2011 |
| EP | 288663 A2 | 6/2016 |

OTHER PUBLICATIONS

Soler et al. "Aluminum and Aluminum Alloys as Sources of Hydrogen for Fuel Cell Applications" Journal of Power Sources 169 (2007) 144-169.
Zhang et al. "Hydrogen generation from pure water using Al—Sn powders consolidated through high-pressure torsion" Journal of Materials Research vol. 31(6) Jun. 2017.
Abbas et al. "Hydrogen production using Al—Sn alloys prepared by rapid solidification" Journal of Advanced Physics vol. 13(6) Jun. 2017.
"Cryogenics" retrieved from Wikipedia on Sep. 14, 2018 and dated Jul. 13, 2016.
PCT Search Report dated Nov. 19, 2019.
Notice of Preliminary Rejection for related KR 10-2020-7005052 application from South Korean Patent Office dated Nov. 17, 2020 (machine translation in English also provided).
Patent Request Notification of Opinion Submission for related KR 10-2020-7005052 application from South Korean Patent Office dated Jun. 27, 2020 (machine translation in English also provided).
Communication from European Patent Office for related EP18838336 application dated Jun. 22, 2020.

Ma Kaka et al: "Mechanical behavior and strengthening mechanisms in ultrafine grain precipitation-strengthened aluminum alloy", Acta Materialia, Elsevier, Oxford, GB,vol. 62, Oct. 24, 2013 (Oct. 24, 2013), pp. 141-155.
Zhang Z et al: "Orientation of nanocrystals in rapidly solidified Al-based alloys and its correlation to the C22C compound-forming tendency of alloys", Journal of Crystal Growth, Elsevier, Amsterdam, NL, vol. 281, No. 2-4, Aug. 1, 2005 (Aug. 1, 2005), pp. 646-653.
Dryzek Jerzy et al: "Positron annihilation and tribological studies of nano-embedded Al alloys", Bulletin of Materials Science, Indian Academy of Sciences, IN, vol. 38, No. 5, Oct. 9, 2015 (Oct. 9, 2015), pp. 1141-1148.
"Hydrogen on Tap," AlGalCo, available at: https://sites.google.com/a/algalcoonline.com/algalco-hydrogen-on-tap/ (dated Sep. 2019).
International Preliminary Report on Patentability dated Sep. 10, 2019 (Sep. 10, 2019) for PCT/US2018/043267.
Communication from European Patent Office for related EP18838336 application dated Jul. 9, 2020.
Notice of Allowance for related KR Application No. 10-2020-7005052 from the Korean Patent Office dated Feb. 23, 2021 (machine translation in English also provided).
Allowed Claim Set for KR 10-2020-7005052 application (in English) (allowed by South Korean Patent Office on Feb. 23, 2021).
Certificate of Patent for related KR Application No. 10-2020-7005052 (Registration Date: May 20, 2021).
First Examination Report for related EP Application No. 18 838 336.8-1103 from the European Patent Office dated Apr. 23, 2021.
Guang, R et al., "Formation of nanocrystalline and amorphous phase of Al—Pb—Si—Sn—Cu powder during mechanical alloying", Materials Science and Engineering: A, Elsevier, Amsterdam, NL, vol. 416, No. 1-2, Jan. 25, 2006 (Jan. 25, 2006), pp. 45-50.
Office Action for related Chinese Application No. 01880054750.3 from the Chinese Patent Office dated May 20, 2021 (translation in English also provided).
"Powder Metallurgy: Principles and Applications" by F.V. Lenel; Metal powder Industries Federation, Princeton, New Jersey, 1980, pp. 59-72.
"Principles and Prevention of Corrosion" by Denny A. Jones, Second Edition, Prentice Hall, NJ, 1996, pp. 168-177.
"Advanced Inorganic Chemistry" by F. Albert Cotton, Geoffrey Wilkinson, Carlos A. Murillo and Manfred Bochmann, Sixth Edition, John Wiley & Son, Inc., New York, 1999, p. 1167.
Wikipedia entry for "Colloidal Gold," available at https://en.wikipedia.org/wiki/Colloidal_gold (accessed Jun. 13, 2021; page states "last updated on May 20, 2021").
David McNally, "Army discovery may offer new energy source," ARL Public Affairs (Jul. 25, 2017)—https://www.army.mil/article/191212/army_discovery_may_offer_new_energy_source.
David McNally, "Army scientists discover power in urine," ARL Public Affairs(Sep. 14, 2017)—https://www.army.mil/article/193647/army_scientists_discover_power_in_urine.
Jacqueline M. Hames, "New nanomaterial paves the way for green energy solutions," USAASC (Sep. 18, 2018)—https://www.army.mil/article/211271/new_nanomaterial_paves_the_way_for_green_energy_solutions.
"Army hydrogen-generation discovery may spur new industry," U.S. Army CCDC Army Research Laboratory (Jul. 16, 2019)—https://www.army.mil/article/224584/.
Tim Collins, "US military discovers a powder that can be used by soldiers to quickly charge up equipment on the frontline," The Daily Mail (Aug. 11, 2017)—http://www.dailymail.co.uk/sciencetech/article-4782204/US-Army-powder-generates-electricity-contact-water.html.
Jon Lockett, "Urine the Army Now: Military scientists develop state-of-the-art weapons and tanks fueled by soldiers' Pee," The Sun UK (Dec. 28, 2017)—https://www.thesun.co.uk/news/5152415/military-weapons-tanks-fuelled-soldiers-pee-maryland/.
Jacqueline M. Hames, "Just Add Water!" Army ALT Magazine, Science and Technology (Sep. 17, 2018)—https://asc.army.mil/web/news-alt-ond18-just-add-water/.

(56) References Cited

OTHER PUBLICATIONS

"Army discovery may offer new energy source," U.S. Army DEVCOM Army Research Laboratory (Jul. 21, 2017)—https://youtube.com/watch?v=oAE407SjFPM.

"Army discovers power in Urine," U.S. Army DEVCOM Army Research Laboratory (Sep. 11, 2017)—https://www.youtube.com/watch?v=BjV0qo6qz1l.

"Podcast: Power on Demand from Aluminum and Water," U.S. Army DEVCOM Army Research Laboratory (Jul. 8, 2019)—https://www.youtube.com/watch?v=N57mTOAScD8.

"GFS Innovators Corner #3: Instantaneous Hydrogen Generation for Soldier Power," U.S. Army Professional Forum (Apr. 3, 2018) https://www.youtube.com/watch?v=mqGeSAocNKU.

Federal Register, "Notice of Availability of Government-Owned Inventions; Available for Licensing," 83 FR 28625 (dated Jun. 20, 2018)—https://www.federalregister.gov/documents/2018/06/20/2018-13225/notice-of-availability-of-government-owned-inventions-available-for-licensing.

Federal Register, "Notice of Intent To Grant Exclusive Patent License to H2 Power, LLC; Chicago, IL," 83 FR 63633 (dated Dec. 11, 2018)—https://www.federalregister.gov/documents/2018/12/11/2018-26761/notice-of-intent-to-grant-exclusive-patent-license-to-h2-power-llc-chicago-il.

"Aluminum Based Nanogalvanic Alloys for Hydrogen Generation," DEVCOM Army Research Laboratory, https://www.arl.army.mil/business/intellectual-property/alnanogalvanicpowder/ (undated, but believed to be created around Jun. 2018).

Office Action for related Japanese Patent Application No. 2020-504403 (dated Aug. 23, 20221; dated Aug. 31, 2021).

Huihu Wang et al, "Investigation on hydrogen production using multicomponent aluminum alloys at mild conditions and its mechanism, International Journal of Hydrogen Energy", Elsevier, 2013, 02, 06, vol. 38, Issue 3, pp. 1236-1243, https://doi.org/10.1016/j.ijhydene.2012.11.034.

\* cited by examiner

ALUMINUM BASED NANOGALVANIC COMPOSITIONS USEFUL FOR GENERATING HYDROGEN GAS AND LOW TEMPERATURE PROCESSING THEREOF

CROSS-REFERENCE TO RELATED APPLICATIONS

This patent application claims the benefit of U.S. Provisional Patent Application No. 62/536,143 titled "Aluminum Based Nanogalvanic Alloys for Hydrogen Generation" and filed on Jul. 24, 2017. The entire contents of said provisional patent application, including all attachments and documents referenced therein, are hereby incorporated by reference herein.

GOVERNMENT INTEREST

The embodiments described herein may be manufactured, used, and/or licensed by or for the United States Government without the payment of royalties thereon.

BACKGROUND

Technical Field

The embodiments herein generally relate to aluminum alloys and aluminum-based microstructures that are useful for generating hydrogen gas.

Hydrogen has one of the highest energy density values per unit mass, 142 MJ/kg which is equivalent to 39.4 kWh of combustible energy. With such a large energy content, hydrogen can be used to generate power. Hydrogen gas can be used in cars, in houses, for portable power, and in many more military and civilian applications. Hydrogen can be generated by any of the following processes: biomass gasification, biomass derived liquid forming, natural gas reforming, coal gasification, thermochemical water splitting, electrolysis, photobiological, and microbial biomass conversion (https://energy.gov/eere/fuelcells/hydrogen-production).

Another way to produce hydrogen is reacting certain chemical compounds, metals and alloys with certain solvents e.g. methanol, water etc. Aluminum reacts with water to produce hydrogen gas according to the following equations:

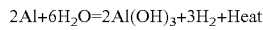
$2Al+6H_2O=2Al(OH)_3+3H_2+Heat$

$2Al+4H_2O=2AlOOH+3H_2+Heat$

$2Al+3H_2O=Al_2O_3+3H_2+Heat$

However it is often necessary for the solvent to be at high temperature and for the water to be additionally alkaline (e.g. sodium hydroxide and potassium hydroxide) or acidic (e.g. hydrochloric acid and nitric acid) for the hydrogen producing reaction to take place. It is also often necessary to use a catalyst e.g. expensive platinum, gallium metal and/or externally applied power etc. Moreover many of the chemicals and the solvents are highly toxic e.g. methanol, sodium borohydride, lithium hydride, etc. and so also the reaction byproduct.

It is well known that under certain conditions aluminum can react with water at room temperature to produce hydrogen and non-hazardous aluminum oxide/hydroxide or some combination thereof. This reaction releases heat equivalent to 4.3 kWh of energy per kg of aluminum. 1 kg of aluminum reacting water produces 111 g of hydrogen that is equivalent to 4.4 kWh of combustible energy. Thus a total of 8.7 kWh of energy per kg of aluminum could be released from the aluminum-water reaction that could be utilized for a multitude of applications. Water is readily available almost everywhere so in many cases it is not necessary to carry it, thereby removing the associated energy density penalty. However if it needs to be carried, the total potential energy per kg of Al+ water will be 4.3 kWh. For certain applications, e.g. fuel cell applications, it is possible to reclaim 50% of the water; and in that case the total potential energy available will be 5.8 kWh/kg. The energy density of gasoline and methanol, the two most common fuels, are 12.8 kWh and 5.5 kWh per kg., respectively. The gravimetric energy density of Al (with and/or without water) is similar to methanol, and 33%-66% of gasoline. In certain situations, it is more important to consider the volumetric energy density than the gravimetric. In this regard, aluminum has the highest volumetric energy density among non-nuclear fuels—more than twice that of gasoline and more than five times that of methanol. If water is available, aluminum is a very desirable choice to generate power via hydrogen generation. If the total required volume of water is considered, the volumetric energy density of aluminum is 65% that of gasoline. However, when the hydrogen is used in fuel cell technology, 50% of the water can be reclaimed and utilized (i.e. removing half of the amount of water) then the energy density equals approximately that of gasoline. Currently methanol is the principal choice as the source of hydrogen for fuel cells. Hydrogen generated from aluminum can replace methanol. Thus, it is an object of the present invention to generate hydrogen gas using aluminum and water or a water containing liquid such as waste water, gray water, urine or any other liquid that contains water.

Aluminum reacts with water to produce hydrogen via the hydrolysis reaction. However in the case of aluminum powders, immediate oxidation (referred to in this case as passivation) occurs at room temperature when the particles come in contact with air or water to form a continuous passivation layer on the free surface. This passivation layer inhibits further reaction with water preventing further hydrolysis. The ability to disrupt this oxidation/passivation mechanism is key to allowing efficient production of hydrogen via the reaction with water at room temperature without the use of the solvents, acidic and basic solutions, or other catalysts mentioned above.

U.S. Pat. No. 9,011,572 describes aluminum nanoparticles that can be used for generating hydrogen. U.S. Pat. No. 9,011,572 describes aluminum nanoparticles produced from decomposition for an alane precursor, $AlH_3$ or $(AlH_3)_n$, or alane complexes such as dimethylethyl alane in the presence of a catalyst. The nanoparticles require an organic passivation agent that forms an organic coating around the aluminum nanoparticles.

US Patent Pub. No.: US 2008/0056986 A1 describes a method of producing aluminum-gallium mixture pellets that is capable of oxidizing in water to form hydrogen and a passivation surface layer of the oxide component and a passivation preventing agent that is substantially inert to water in an effective amount to prevent passivation of the solid-state material during oxidation. Gallium is expensive and aluminum-gallium pellets are mechanically unstable and unsuitable for manufacturing bulk mechanically stable structures e.g. self-cannibalizing robots, and drones, utilizing conventional metallurgical and additive manufacturing processes. The present invention provides aluminum-based compositions that are capable of generating hydrogen without requiring the inclusion of gallium.

It is an object of the present invention to provide an aluminum-based composition that can generate hydrogen upon contact with water but does not require an alane precursor or an organic passivation agent. Desirably, such an aluminum-based composition would be less expensive and easier to make. It would also be desirable to produce aluminum-based compositions that generate hydrogen but are not necessarily nanoparticle sized. Nanoparticles are considered to be difficult to handle and not as safe as larger particles, for example particles having an average size greater than 100 nm.

SUMMARY

In view of the foregoing, an embodiment of the present invention provides a method of forming an aluminum, an aluminum alloy or other aluminum-based composition that generates hydrogen gas upon contact with water or other aqueous compositions, the method comprising: providing aluminum, an aluminum alloy or another aluminum-based composition; providing a second metal, second alloy or other second metal-based composition; milling the aluminum, aluminum alloy or other aluminum-based composition and second metal, alloy or other metal-based composition to produce a powder; producing a milled, powder composition that comprises grains or subgrains of aluminum with individual grains or subgrains of the dispersed second metal, second alloy or other second metal-based composition having atomic to nano-scale or micro-scale dimensions.

In certain embodiments, the milling occurs at a temperature less than or equal to the ductile to brittle transition temperature of tin (Sn) 13.2° C. (286.2 K). In other embodiments, the milling occurs at a temperature 50° C. below the ductile to brittle transition temperature for Tin (Sn). In certain other embodiments, the milling occurs at a temperature 100° C. below the ductile to brittle transition temperature for tin (Sn). In other embodiments, the milling occurs at a temperature 150° C. below the ductile to brittle transition temperature for tin (Sn). In yet other embodiments the milling occurs at a temperature 270° C. below the ductile to brittle transition temperature for tin (Sn). In other embodiments, the milling occurs at a temperature within 25° C. of the ductile to brittle transition temperature for tin (Sn). In yet other embodiments, the milling occurs at a temperature within 50° C. of the ductile to brittle transition temperature for tin (Sn), or within 100° C. of the ductile to brittle transition temperature for tin (Sn) or is conducted over temperature range from about +100° C. to about −270° C. in which the aluminum (Al) undergoes embrittlement. certain embodiments, the milling occurs over temperature range from about +100° C. to about −270° C. and in which the dispersed phase or solute comprises tin (Sn), magnesium (Mg), silicon (Si), bismuth (Bi), lead (Pb), gallium (Ga), indium (In), zinc (Zn) carbon (C), or mixtures thereof and further wherein the disperse phase or solute undergoes embrittlement. In some embodiments, the milling occurs under or in a low temperature liquid or fluid that is at a temperature ≤24° C. or under or in a cryogenic liquid that is at a temperature ≤−75° C.

In some embodiments the milled, powder composition comprises at least 0.1 atomic percent tin (Sn), magnesium (Mg), silicon (Si), bismuth (Bi), lead (Pb), gallium (Ga), indium (In), zinc (Zn) or carbon (C), or a mixture thereof. In other embodiments, the milled, powder composition comprises at least 1 atomic percent tin (Sn), magnesium (Mg), silicon (Si), bismuth (Bi), lead (Pb), gallium (Ga), indium (In), zinc (Zn) or carbon (C), or a mixture thereof. In yet other embodiments, the milled, powder composition comprises at least 2.5 atomic percent tin (Sn), magnesium (Mg), silicon (Si), bismuth (Bi), lead (Pb), gallium (Ga), indium (In), zinc (Zn) or carbon (C), or a mixture thereof. In still yet other embodiments, the milled, powder composition comprises between about 0.1 atomic percent tin and about 49.99 atomic percent tin (Sn), magnesium (Mg), silicon (Si), bismuth (Bi), lead (Pb), gallium (Ga), indium (In), zinc (Zn) or carbon (C), or a mixture thereof.

In certain embodiments, the milled, powder composition comprises at least 0.1 atomic percent tin or bismuth or a mixture thereof. In certain other embodiments, the milled, powder composition comprises finely divided powder particles having diameters ranging from about 1 micron to about 10,000 microns. In other embodiments, the milled, powder composition comprises finely divided powder particles having diameters ranging from about 1 micron to about 1000 microns. In yet other embodiments, the milled, powder composition comprises finely divided powder particles having diameters ranging from about 10 nanometers to about 1000 nanometers.

In certain embodiments, the method further comprises adding a surfactant to prevent the powder from bonding to the milling container during milling. In certain embodiments, the present invention provides a dispersion of solutes in the solvent or matrix resulting in a reaction rate wherein the hydrogen production is greater than 74% of the theoretical yield for aluminum at 25° C. (298 K) and 1 atm. in less than or equal to 30 seconds. In certain embodiments, the present invention also provides a dispersion of solutes in the solvent or matrix resulting in a reaction rate wherein the hydrogen production is greater than 74% of the theoretical yield for aluminum at 25° C. (298 K) and 1 atm. in 5 minutes. In yet other embodiments, the present invention provides a dispersion of solutes in the solvent or matrix resulting in a reaction rate wherein the hydrogen production is greater than 74% of the theoretical yield for aluminum at 25° C. (298 K) and 1 atm. in 50 minutes. In still yet other embodiments, the present invention provides a dispersion of solutes in the solvent or matrix resulting in a reaction rate wherein the hydrogen production is greater than 74% of the theoretical yield for aluminum at 25° C. (298 K) and 1 atm. in 500 minutes. And in other embodiments, the present invention provides a dispersion of solutes in the solvent or matrix resulting in a reaction rate wherein the hydrogen production is greater than 74% of the theoretical yield for aluminum at 25° C. (298 K) and 1 atm. in 5000 minutes.

In some embodiments, the method further includes compacting the milled, powder composition into a densified structure. And in some embodiments, the method includes compacting the milled, powder composition into a tablet, a rod, a pellet or a bulk part wherein the tablet, rod, pellet or bulk part generates hydrogen when the tablet, rod, pellet or bulk part contacts water or a water containing liquid.

The present invention also provides a galvanic metal microstructure that comprises: an anodic matrix comprising aluminum, an aluminum alloy or another aluminum-based composition; and a cathodic disperse phase comprising a second metal, second alloy or other second metal-based composition is selected from the group consisting of: tin (Sn), magnesium (Mg), silicon (Si), bismuth (Bi), lead (Pb), gallium (Ga), indium (In), zinc (Zn), carbon (C), and mixtures and alloys thereof wherein said cathodic disperse phase forms galvanic couples with the anodic matrix and produce hydrogen gas when said galvanic metal microstructure contacts with water, a water containing liquid or another electrolyte. In some embodiments, the cathodic disperse phase comprises a plurality of discreet particles having a length of less than 1 millimeter. In other embodiments, the cathodic disperse phase comprises a plurality of discreet particles having a length of less than 1000 nanometers. In yet other embodiments, the cathodic disperse phase comprises a plurality of discreet particles having a length of less than 500 nanometers, or a length of less than 200 nanometers, or less than 100 nanometers or even less than 50 nanometers.

In certain embodiments, the cathodic disperse phase comprises tin (Sn). In certain other embodiments, the cathodic disperse phase consists primarily of tin (Sn) or an alloy of tin. In some embodiments, galvanic metal microstructures of the present invention are made by melt spinning, spray atomization, inert gas condensation, solution precipitation, physical vapor deposition, or electrodeposition.

The present invention also provides a method of generating hydrogen.

BRIEF DESCRIPTION OF THE DRAWINGS

The embodiments herein will be better understood from the following detailed description with reference to the drawings, in which.

DETAILED DESCRIPTION

Figure 1:
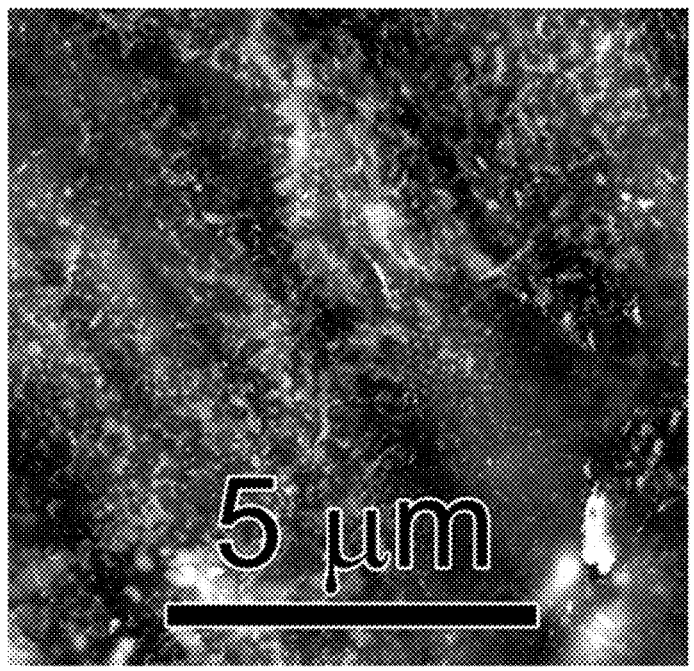
FIG. 1 is a back-scattered electron (BSE) micrograph taken with a scanning electron microscope (SEM) of an aluminum-tin alloy of the present invention (the dark phase is primarily aluminum and the lighter/bright phase is primarily tin)

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As used herein, the term nano-scale means diameter of particles less than 1000 nm, preferably less than 100 nm and even less than 10 nm. Micro-scale means diameter of particles less than 1000 micrometers, preferably less than 100 micrometers and even less than 10 micrometers. Atomic scale means particles having physical dimensions as small as the atomic diameter of the specified elements and as large as particles containing a few hundred individual atoms of those element.

Embodiments described herein provide compositions useful for generating hydrogen gas when contacted with water or water containing liquids including but not limited to gray water, urine, pond water and so forth. Aluminum based alloys can be made to generate hydrogen very rapidly by reaction with water at room temperature by forming galvanic cells. The galvanic effect continuously allows the exposure of new unoxidized metallic surface thus allowing for further hydrolysis at room temperature. The alloys may be composed of primarily aluminum and other metals including, but not limited to, tin (Sn), magnesium (Mg), silicon (Si), bismuth (Bi), lead (Pb), Gallium (Ga), Indium (In), Zinc (Zn), Carbon (C), or the like and mixtures thereof.

In certain desirable embodiments the present invention provides nanostructured aluminum-based alloys for spontaneous, facile and rapid generation of hydrogen at room or elevated temperatures without externally applied power, by reacting the composition, for example in powder form, with water and/or liquids containing water. By coupling compositions of the present invention with fuel cells or a hydrogen internal combustion engine the compositions will enable effortless generation of power to run electronic equipment, transportation vehicles, and powered mechanisms and so forth. This will be useful for various products and services for defense and civilian applications. Actuation and propulsion systems that require rapid pressurization may also be benefitted. Thus, hydrogen generation from water or water based reactions with compositions of the present invention can replace or supplement hydrocarbon fuels.

A method of producing nanogalvanic structured aluminum based particulate material of the present invention is described herein and includes high energy ball milling of aluminum and other optional metals at room temperature, preferably at reduced temperatures and more preferably at cryogenic temperatures. Thus, in certain embodiments the method of the present invention includes ball milling of aluminum at temperatures below about 30° C., more preferably below about 25° C., still more preferably below about 20° C., still more preferably below about 10° C., still more preferably below about 5° C., still more preferably below about 0° C., still more preferably below about −25° C., still more preferably below about −50° C., still more preferably below about −100° C., still more preferably below about −150° C., still more preferably below about −200° C. and still more preferably below about −250° C. Milling of aluminum and aluminum alloys at reduced temperatures is capable of producing nanogalvanic alloys that can produce hydrogen very rapidly by the hydrolysis reaction with water at room temperature without an externally coupled power supply. Thus, the method of making compositions of the present invention may include cooling the metal or metallic powders from ambient temperature to cryogenic temperatures during processing of the powders. This can be achieved by cooling the milting device or milling device chamber with coolant fluids or coolant cryogens such as liquid nitrogen, liquid oxygen, liquid argon or even liquid helium.

The aluminum may be essentially pure aluminum (i.e. greater than 98 atomic percent of aluminum and preferably greater than 99 atomic percent of aluminum), an alloy of aluminum, preferably an alloy of aluminum containing greater than 90 atomic percent of aluminum, more preferably greater than 70 percent of aluminum and more still preferably greater than 50 atomic percent of aluminum, and scrap aluminum for example aluminum cans. Suggested examples of aluminum alloys include but are not limited to, Al5056 and aluminum alloys of 1000, 2000, 3000, 5000, 6000, and 7000 series. Preferably the aluminum alloy contains at least 99, 98, 95, 90, and at least 80 atomic percent aluminum. Scrap aluminum powders were used to produce scrap Al—Sn alloys that produced hydrogen when the scrap Al—Sn alloys reacted with water.

Nanogalvanic cells with aluminum as the anode can be coupled with another element acting as the cathode e.g. metals including, but not limited to, tin (Sn), magnesium (Mg), silicon (Si), bismuth (Bi), lead (Pb), gallium (Ga), indium (In), zinc (Zn), carbon (C), or the like and mixtures thereof. The galvanic couple is made by the close and intimate contact of the two dissimilar metals which have different corrosion potentials (i.e. one acting as an anode and other as a cathode). The nanogalvanic effect disrupts the oxide layer rapidly exposing new metallic surfaces and thus enhances the hydrolysis reaction at room temperature which in turn rapidly accelerates hydrogen production.

Galvanic corrosion occurs when two dissimilar metals make contact with one another in the presence of an electrolyte thereby forming a galvanic couple. The more noble metal (more cathodic on the galvanic series) provides additional surface area for the reduction reaction to occur on. This accelerates the oxidation/corrosion of the less noble metal (more anodic on the galvanic series). The extent of corrosion is greatest at the interface of the two metals, but may also occur at some distance away from the actual interface. In addition, the cell kinetics in this case are enhanced when the cathode is smaller in surface area relative to the anode.

Nanostructured nanogalvanic binary or higher order alloys consisting of aluminum (Al) metal comprising 50 to 99.9 atomic percent (at. %) as one of the constituents were processed by a non-equilibrium process. The other constituent(s) may be one or a combination of the following elements including, but not limited to: tin (Sn), magnesium (Mg), silicon (Si), bismuth (Bi), lead (Pb), gallium (Ga), indium (In), zinc (Zn), carbon (C) and mixtures thereof ranging from about 0.1 to about 50 atomic percent of the constituent(s).

Examples of milling apparatuses can be far ranging to include but not limited to: The SPEX Industries, Edison, N.J. series of mills or Zoz GmbH, Germany, series of mills. Relatively lower energy types include the Pulverisette planetary ball mills from Fritsch GmbH, Idar-Oberstein, Germany; the PM series of planetary ball milk from Retsch GmbH, Dusseldorf, Germany; or the attritor type mills from Union Process, Akron, Ohio, Jet Mill and Jar Mill from Glen Mills, Clifton, N.J. Relatively lower energy types of suggested milling apparatuses include the Pulverisette planetary ball mills from Fritsch. GmbH. War-Oberstein, Germany; the PM series of planetary hail mills from Retsch GmbH Dusseldorf, Germany; or the attritor type mills from Union Process, Akron, Ohio, Jet Mill and Jar Mill from Glen Mills, Clifton, N.J. To avoid cold welding and sticking to the vial and milling media, the milling process can be carried out at liquid nitrogen temperatures and/or with surfactants/additives. Suggested additives and surfactants include, but are not limited to, stearic acid, oleic acid, oleyl amine, valeric acid, octanoic acid, decanoic acid, undecanoic acid, palmitic acid, ethanol, hexane, dodecane and other long chain hydrocarbon compounds and mixtures thereof. Surfactants and additives can be utilized with the metallic powders and milling media and vials during the milling process. Desirably, the surfactant is a solid or a liquid at room temperature particularly when the milling is performed at ambient or room temperature. Desirably, the milling balls and the mixing vials are comprised of hard wear-resistant materials including, but not limited to, metals, ceramics, oxides and combinations thereof.

The alloys described herein, due to their unique compositions and synthesis method have the fastest rate of hydrogen generation at room temperature without externally applied power or other catalysts reported in literature when reacted with water—as high as 1000 ml of hydrogen per gram of aluminum in as low as about 30 seconds. These non-hazardous alloys consisting of abundantly available and inexpensive constituents will result in facile production of hydrogen for power generation and various other military and civilian applications. Furthermore, the reaction is so pervasive that the hydrolysis reaction will occur in any fluid containing water and many compounds containing OH (hydroxyl) groups.

Aluminum oxidizes rapidly when it comes in contact with air or water and an oxide layer is formed on the surface of the particles. This oxide layer typically inhibits reaction with water. In order for the reaction to take place it is necessary to disrupt the oxide layer. Current state of the art materials with unstable oxides consist of alloys of aluminum with gallium produced by conventional melt casting. These alloys are very expensive—the price of gallium metal is about 100 times that of aluminum. Small grains and/or small anodic or cathodic dispersions provide the efficient nanogalvanic effect that sweeps away the oxide layer rapidly exposing new metallic surfaces and thus enhances the hydrolysis reaction at room temperature reported here. This invention, however, achieves the enhanced reaction kinetics through processing of nanostructured aluminum based galvanic alloys by high energy ball milling at cryogenic temperature.

The Al-alloy powders may be produced by ball milling pure aluminum with other metals including but not limited to, tin (Sn), magnesium (Mg), silicon (Si), bismuth (Bi), lead (Pb), gallium (Ga), indium (In), zinc (Zn), carbon (C), for 0.01 to 8 hours at cryogenic temperature such as at −100° C. and −196° C. Pure aluminum may be substituted by or commercially available aluminum alloys e.g. AA5056, AA5083, etc. The individual powder particulate size can be in the range of 0.01 μm-6 mm in diameter. Additionally, the powder could be consolidated to form compacts or functional parts for tuning the hydrogen generation rate and yield. For example, powders of the present invention could be consolidated to produce a tablet, a rod, a pellet or a bulk part. Additionally, powders of the present invention would be coated on to the surface of a component or part. Suggested processes include, but are not limited to, metal injection molding, cold and hot isostatic pressing, additive manufacturing techniques including laser and non-laser techniques, thermal and cold spray and additive friction stir welding, powder forging, hot pressing, pressure less sintering, shock consolidation and field assisted sintering.

The nanogalvanic structured Al-alloys when reacted with water at room temperature will produce ~1000 ml of hydrogen gas per gram of aluminum in as low as ~30 seconds after reaction starts and also as high as 100% the theoretical limit in ~3 min. However, there exist other applications where lower or higher reaction rates/hydrogen yields may be required or beneficial. Please see included data plots (FIGS. 7-12) to see general volumes and rates of hydrogen generation versus reaction time. Any aluminum base material (e.g. scrap aluminum, etc.) when alloyed with other specific metals e.g. tin (Sn), magnesium (Mg), silicon (Si), bismuth (Bi), lead (Pb), gallium (Ga), indium (In), zinc (Zn), carbon (C), or the like by high energy ball milling at cryogenic temperature may produce hydrogen at room temperature when reacted with water without externally coupled power. The inherent ability to form corrosive galvanic couples with aluminum was considered in selecting the aforementioned elements. The addition of carbon to the alloys during ball milling may enhance hydrogen generation rate, both as a surfactant as well as a galvanic couple. Furthermore, the data present here, is a starting point, that is the method has not been optimized but rather some adjustments of compositions and processing parameters have been done to maximize the rate and amount of hydrogen generation for a particular composition and processing i.e. cryogenic milling. However, currently, only one synthesis technique has been pursued. Other alternative processing techniques, such as room temperature large scale ball milling utilizing surfactants and or melt-spinning or spray atomization can be used to produce nanogalvanic powders having the same patentable characteristics.

In order that the invention may be more readily understood, reference is made to the following examples which are intended to illustrate the invention, but not limit the scope thereof.

Examples 1A-1K: Formation of Aluminum Alloy Powders Metal Using High-Energy Milling at Cryogenic Temperature (−75° C. to −270° C.)

Alloys consisting of an aluminum alloy AA5056 and tin (Sn) were prepared by loading the respective powders with the correct weight ratio into a clean hardened steel vial to produce the desired atomic percent alloy. AA5056 alloy at −140/+325 mesh was obtained from Valimet, Inc., 431 East Sperry Road, Stockton, Calif. 95206. The AA5056 alloy is reported to contain Al (balance), 0.15% Cr, <0.01% Cu, 0.10% Fe, 5.22% Mg, 0.13% Mn, 0.04% Si, <0.01% Zn, others total <0.15%. Sn was obtained from Alfa Aesar and is reported to have 98.5%, purity, −325 mesh (approximately 45 μm). The AA5056: Sn mass ratio in Example 1A was maintained at 7.5:1. As such, it was expected that the resultant alloy would have had a similar composition of AA5056-2.97.0 at. % Sn. Alternatively, alloys consisting of pure aluminum and tin with compositions Al-x at. % Sn (with x=1, 2.97, 3.7, 4.5, 5.7, 7 and 20, Examples 1B to 1H, respectively) were prepared by loading the respective powders with the correct weight ratio into a clean hardened steel vial to produce the desired atomic percent alloy. Al was obtained from Alfa Aesar and is reported to have 99.5%, purity, −325 mesh (approximately 45 μm). The Al:Sn mass ratio were varied from 19:1 to 1:1 depending on the composition of the powders. Also AA5056-Bi and Al—Bi powders were prepared by loading the respective powders with the correct weight ratio into a clean, hardened steel vial to produce the desired atomic percent alloy. Bi, −325 mesh (approximately 45 μm), was obtained from Alfa Aesar and is reported to have 99.5% purity. Both the AA5056:Bi and Al:Bi mass ratio here was maintained at 4:1. As such, it was expected that the resultant alloys would have had a similar composition of AA5056-3.1 at. % Bi and Al-3.1 at. % Bi. Additionally, AA5056-x at. % Sn-(3-x) at. % Bi (with x=1.5, 1.8, and 2.25) alloys were also synthesized (Examples 11 to 1K, respectively).

Thirty three (33) stainless steel (440C) ball-bearings, 17 of which having a diameter of ¼ inch and the other 16 having a diameter of 5/16 inch, were used as the milling media in a 8000D SPEX shaker mill. The 10-gram powder mass of the constituent elements (e.g. AA5056, Al, Sn and Bi) comprising the particular alloys were milled with a 5:1 ball-to-powder mass (weight) ratio. Suggested ball-to-powder mass (weight) ratio ranged from 5:1 to less than or equal to about 1:1. Vials were sealed in a primarily Argon atmosphere (i.e., with $O_2$<1 ppm). This milling procedure resulted in a finely divided powder mass, consisting of particulates in the micron rage i.e. diameters between 1 and 10000 microns. However, the interior structure of the particles consist of further structural refinement, specifically, grains or subgrains of Al with individual Sn grains or dispersed Sn particles having nanometer (e.g. less than 100 nanometers) or micron (e.g. less than 100 micrometers) dimensions throughout for alloys containing Sn.

During the high-energy milling process, the metal powder may be subjected to a low or cryogenic temperatures to embrittle the constituents. In general all metals become more brittle with decrease in temperature, because their active slip systems (relating to dislocation and other thermally activated processes governing their mechanical behavior become statistically less active). The type of embrittlement is clearly demonstrated by the well-known ductile-to-brittle transition (DTBT) of ferritic steels. Low temperature processing is defined by processing that occurs at temperature ranging from just below room temperature (24° C.) down to −270° C. Low temperature ball milling here is utilized in this example to keep the powders (AA5056, Al, Sn, and Bi) cold, such that they remain as brittle as possible and thereby preventing or, more precisely, reducing and minimizing the powder from adhering to the milling media and walls of the vial. An additional benefit of low temperature milling is that certain metals or metal powders will undergo a temperature induced crystallographic transformation, also known as an allotropic transformation, from a ductile to a brittle state. For example, pure tin transforms from the silvery, ductile metallic allotrope of β-form white tin to the brittle, nonmetallic, α-form grey tin with a diamond cubic structure at a temperature that is equal to or less than 13.2° C. (286.2 K). Specifically, this brittle transformation induces advantageous milling kinetics, resulting in a favorable dispersion of Sn in Al that would otherwise not be possible and or as optimized for producing a dispersed galvanic couple (a microstructural building box required for successful hydrogen production) having reduced length scales.

In this example, cryogenic temperature is typically defined as temperature below about −150° C. Liquid nitrogen, for instance, having a temperature as low as −196° C. (77K), may be supplied to provide such cooling. Liquid nitrogen milling was made possible by placing the sealed vial in a thick nylon sleeve modified to allow placement into the high energy mill as well as to allow the in-flow and out-flow of liquid nitrogen. The vial was allowed to cool to liquid nitrogen temperature before starting the mill. Mechanical alloying at liquid nitrogen temperatures in the SPEX shaker mill for approximately 4 hours was performed. After the ball milling procedure was completed, the alloyed AA5056-Sn (or Al—Sn) powder was removed from the steel vial in an Ar glove box and stored. This milling procedure resulted in a finely divided powder mass, consisting of particulates in the micron range i.e. diameters between 1 and 10,000 microns. While 4 hours of cryogenic milling was used in this example, it doesn't define the time range over which hydrogen producing powders can be synthesized. This is the same with, the milling energy, ball-to-powder ratio and/or other generic aspects of the milling process including composition.

Example 2: Formation of Aluminum Alloy (AA5056)-Sn and Al—Sn Powder Metal Using High-Energy Milling at Low Temperature (≤24° C.)

In this example, alloys consisting of an aluminum alloy AA5056 and tin (Sn) as well as Al and Sn were prepared by loading the respective powders with the correct weight ratio into a clean hardened steel milling jar to produce the desired atomic percent alloy. 500 g powder mass of AA5056 and tin and 200 g powder mass of Al and Sn along with 1.25 g and 0.5 g of stearic acid were milled with a 10:1 ball-to-powder mass (weight) ratio (i.e. with 5000 g and 2000 g of stainless steel (440C) ball-bearings respectively) were used as the milling media in CM08 and CM02 Zoz mill respectively. The AA5056:Sn and Al:Sn mass ratio in Example 2 were maintained at 7.5:1. As such, it was expected that the resultant alloys would have had similar composition of AA 5056-2.97 at. % Sn and Al-2.97 at. % Sn.

In this example, low temperature here is defined as a temperature ranging from just below the room temperature (<24° C.). Chilled ethylene glycol may be supplied to provide the cooling down to −20° C. Low temperature milling was made possible by circulating ethylene glycol through the built-in cooling jacket around the milling jars (8 L and 2 L capacity for CM08 and CM02 Zoz Mill respectively). The ethylene glycol was continuously cooled and circulated using a water chiller. The milling was performed at 400 RPM for up to 11 hours.

Stainless steel milling jars were sealed in (primarily) an Argon atmosphere (i.e., with $O_2$<1 ppm). After the ball milling procedure was completed, the alloyed powder was transferred from the steel jar into an argon glove box and the powder was stored there. This milling procedure resulted in a finely divided powder mass, consisting of particulates in the micron rage i.e. diameters between 1 and 10,000 microns. However, the interior structure of the particles consist of further structural refinement, specifically, grains or subgrains of Al with individual Sn grains or dispersed Sn particles having nanometer or micron dimensions throughout.

Example 3: Formation of Aluminum Alloy (Aa5056)-Sn and Al—Sn Powder Metal Using High-Energy Milling at Room Temperature (~24° C.)

In this example, AA5056-Sn and Al—Sn powders were prepared by the inventors by loading the respective powders with the correct weight ratio into a clean hardened steel vial to produce the desired atomic percent alloy. The Al:Sn mass ratio in Example 3 was maintained at 7.5:1. Additionally 0.15-0.5 wt % of stearic acid was added. As such, it was expected that the resultant alloy would have had a similar composition of Al-2.97 at. % Sn.

Thirty three (33) stainless steel (440C) ball-bearings, 17 of which having a diameter of ¼ inch and the other 16 having a diameter of 5/16 inch, were used as the milling media in a 8000D SPEX shaker mill. The 10-gram powder mass of Al and Sn was milled with a 5:1 ball-to-powder mass (weight) ratio. Vials were sealed in a primarily Argon atmosphere (i.e., with $O_2$<1 ppm). Mechanical alloying was then performed in a SPEX 8000 shaker mill for up to 6 hours. After the ball milling procedure was completed, the alloyed Al—Sn powder was removed from the steel vial in an argon glove box and stored. Mechanical milling resulted in powders with a particle range of 1-10,000 μm.

Results:

Compositions produced in some of the examples above were characterized using scanning electron microscopy. While not wishing to be bound by the theories provided below, the significance of the structure of some compositions of the present invention is discussed with relation to the hydrogen generation.

Figure 2:
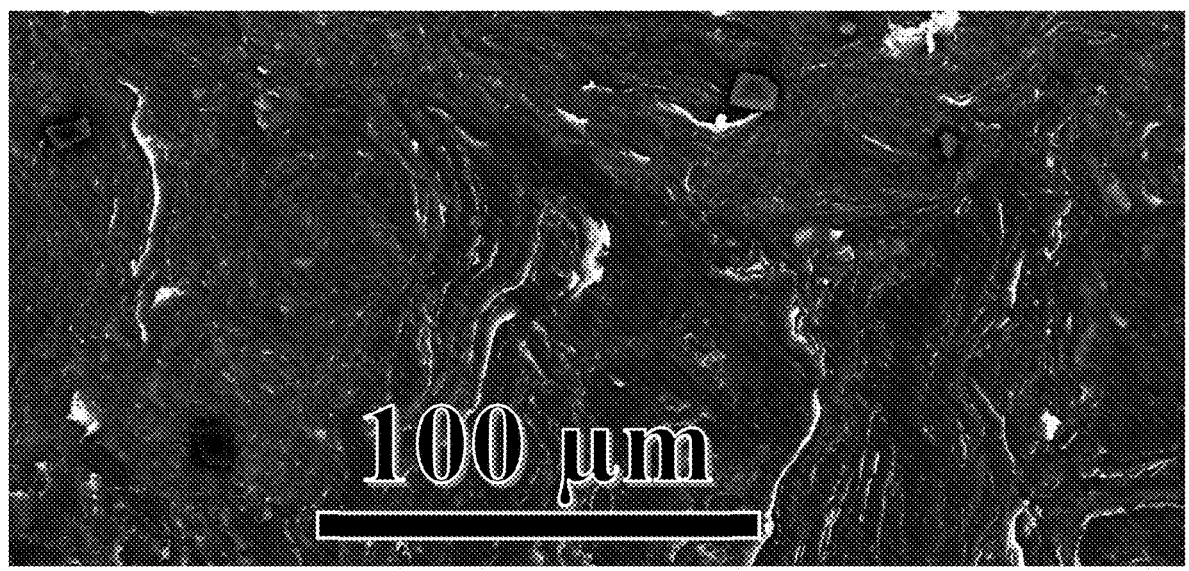
FIG. 2 is another BSE micrograph illustrating the existence of stringers (elongated thin ribbons) of tin of varying size and dispersion in an aluminum-tin alloy of the present invention.

FIG. 1 shows enlarged scanning electron micrograph of one exemplary microstructure of a nanogalvanic metal as it pertains to the invention, specifically Example 2. The dark phase in FIGS. 1 and 2 is primarily Al and the lighter/bright phase is primarily Sn. The Sn exist primarily as discreet particles and or stringers (elongated thin ribbons of Sn) of varying size and dispersion. A galvanic couple is made by the close and intimate contact of the two, in this case Al and Sn, dissimilar metals which have different corrosion potentials (i.e. one acting as an anode and other as a cathode). In this case Al is the anode and Sn the cathode.

Galvanic corrosion occurs when two dissimilar metals make contact with one another in the presence of an electrolyte thereby forming a galvanic couple. The more noble metal (more cathodic on the Galvanic Series) provides additional surface area for the reduction reaction to occur on. This accelerates the oxidation/corrosion of the less noble metal (more anodic on the Galvanic Series). The extent of corrosion is greatest at the interface of the two metals, but may also occur at some distance away from the actual interface. In addition, the cell kinetics are enhanced when the cathode is smaller in surface area relative to the anode.

FIG. 2 is a lower magnification scanning electron micrograph giving a more macroscopic view of the nanogalvanic microstructure than seen in FIG. 1. The nanogalvanic microstructure of the present invention can be defined as a crystallite material in which its microstructure is nano-sized (i.e., on the order or 1, 10 or 100 nm). Some aspects of the microstructure may also be in the ultra-fine length scale (being defined as a length scale between 100 and 1000 nm). Still, some aspects of the microstructure can be even larger i.e. length scales of greater than 1000 nm. The microstructure consists of phases, i.e. the matrix phase and the dispersed phase have at least some of the length scales mentioned above. These phases i.e. matrix phase and the dispersed phase, are composed of solvent and solute species. Here the solvent is primarily Al and the solute species primarily is Sn. However, other elements can be acting as both, e.g. magnesium (Mg), silicon (Si), bismuth (Bi), lead (Pb), gallium (Ga), indium (In), zinc (Zn), carbon (C), or the like. The matrix phase in this case mainly contains the solvent Al. However the matrix phase may consist of a solid solution of aluminum in combination with other dissolved solvents and solutes. A solid solution is a solid-state solution of one or more solutes in a solvent or solvents. Such a multi-component system is considered a solution rather than a compound when the crystal structure of the solvent remains unchanged by addition of the solutes or the solvents in the form of a randomly dispersed atoms i.e. a random solid solution resulting in the chemical components remaining in a single homogeneous phase. Conversely the dispersed phase is primarily made up of solutes that are dispersed in the matrix solvent. Small agglomerations of solute atoms in the solvent are referred to as nuclei or clusters containing one to a few hundred atoms typically being 2-100 nm in diameter. As more and more atoms agglomerate they are termed as particles once the diameters of the agglomerates become greater than 100 nm. These particles can range from 100 nm to 1 mm. Stringers are hereby defined as ribbon-shaped particles primarily composed of solutes that are larger than previously described particles having length from 10 nm up to 10 mm. The ribbons may have finite dimensions in all the three dimensions and may be termed as sheets also.

The matrix can consist of a polycrystalline grain structure in which the grains can be nanocrystalline (i.e., on the order or 1, 10 or 100 nm) or ultra-fine (being defined as a length scale between 100 and 1000 nm) or can be even larger i.e. length scales of greater than 1000 nm. Please note that the cellular structure of grains are separated by grain boundary. Also the larger ribbons could contain polycrystalline grain structure in which the grains can be nanocrystalline (i.e., on the order or 1, 10 or 100 nm) or ultra-fine (being defined as a length scale between 100 and 1000 nm) or can be even larger i.e. length scales of greater than 1000 nm.

Please note that the smaller the size of the grains and the size of the dispersed phased, the higher is the galvanic reactivity. The cell kinetics are enhanced when the cathode is smaller in surface area relative to the anode. In general greater the difference of corrosion potential between the matrix and the dispersed phase higher is the galvanic reactivity.

Figure 3:
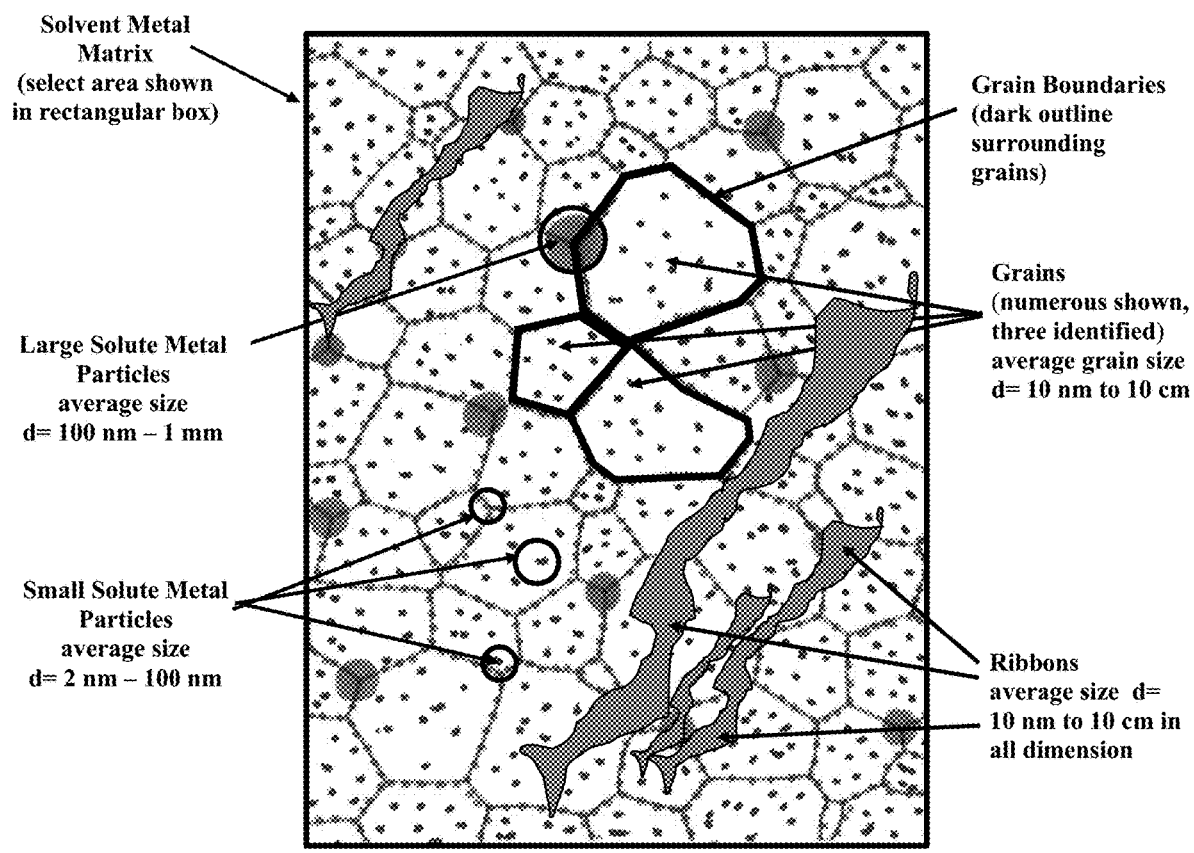
FIG. 3 is a schematic of a nanogalvanic microstructure for rapid hydrogen generation in aluminum-tin alloy of the present invention.

The white portion of FIG. 3 represents the matrix. It forms the medium of the metallic material. It may be Al or an Al-based alloy, for instance. While not truly circular (and actually, of a more random polyhedral shape/cellular structure polygonal shape), grains are assumed to have an average diameter. The grains of the matrix having diameters of no more than about 500 nm, typically ranging from about 10-200 nm. Grain boundaries occur at the interface of separate adjacent grains.

A plurality of dispersed metallic particles formed of solute metal(s) in the solvent metal matrix. The dispersed solute particle reside within grains and along the grain boundaries. They typically have average diameters in the range 20-500 nm. However they could be smaller as well as larger than the given range. In addition at least some of the dispersed particles may further contain additional element(s) such as aspects of the matrix and or other advantageously included elemental species such as oxygen (O), nitrogen (N), carbon (C), sulfur (S), silicon (Si), bismuth (Bi), carbon (C), gallium (Ga), indium (In), lead (Pb) or other element(s) (i.e. from the remainder of the periodic table). Additionally, in some instances, due to processing or otherwise, the particles may comprise solute metal and some small amount of a solvent metal or alloy (such as Al).

Figure 4:
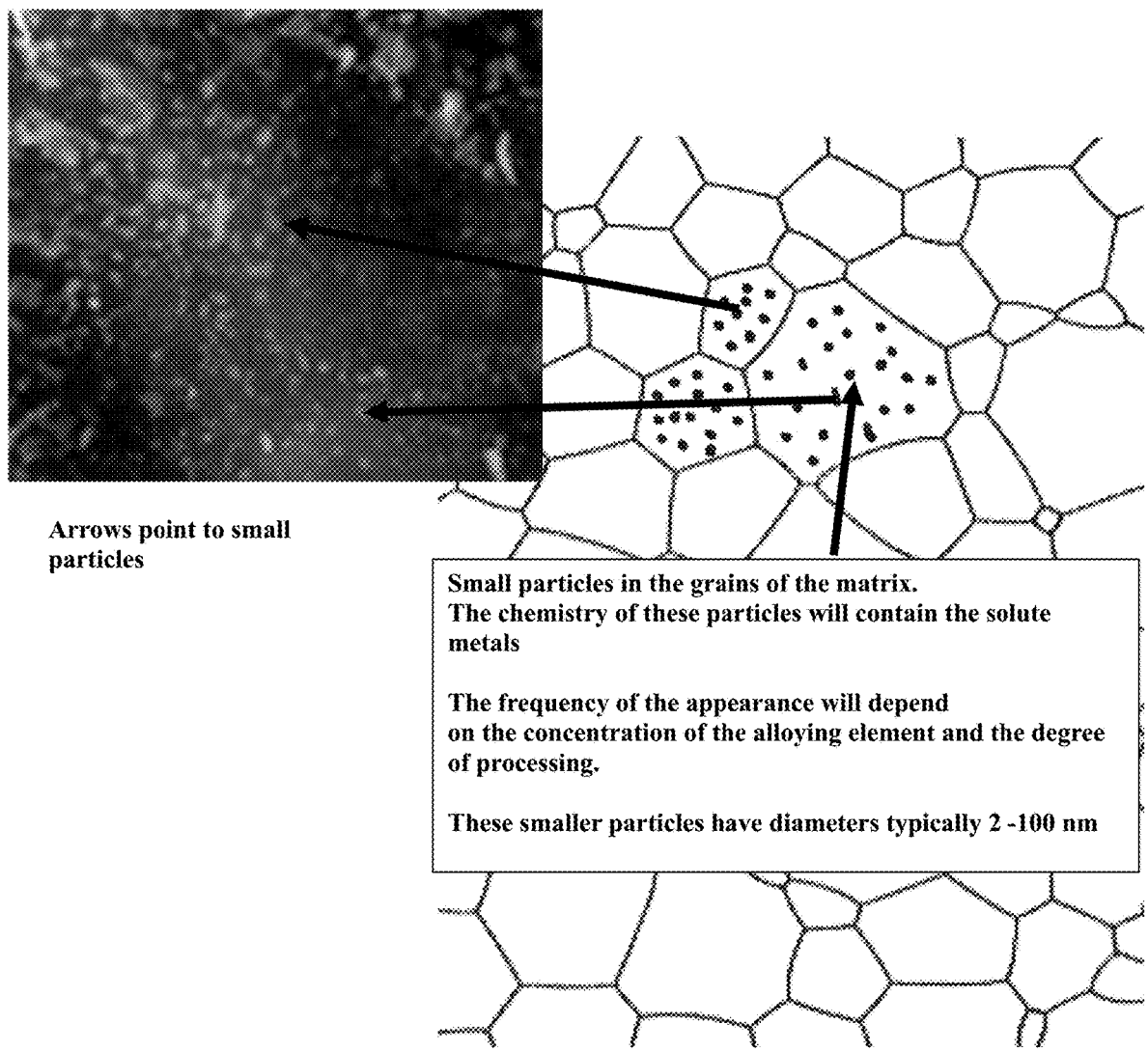
FIG. 4 illustrates dispersion of small particles in the grains of a matrix in an aluminum-tin alloy of the present invention.
Figure 5:
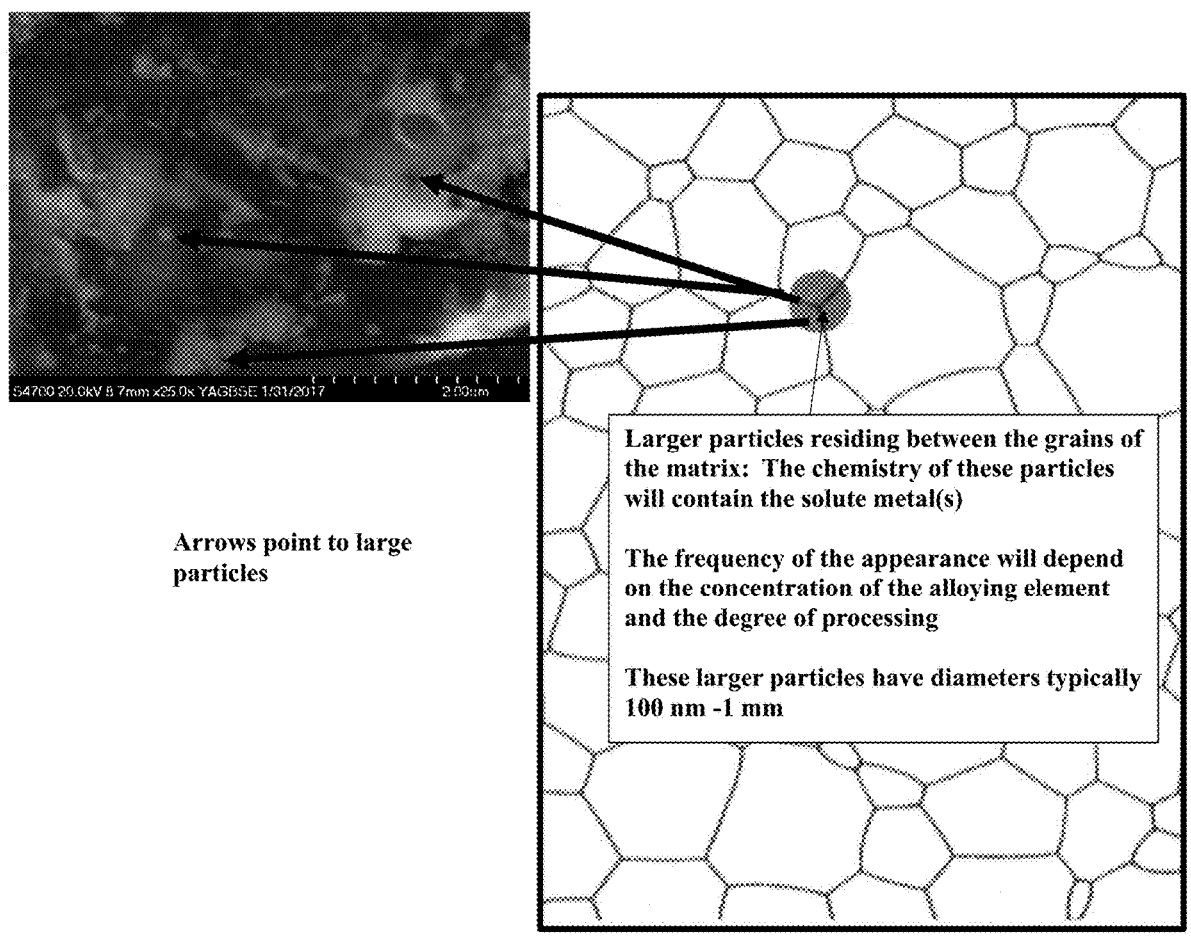
FIG. 5 illustrates large particles residing at the grain boundary in an aluminum-tin alloy of the present invention.
Figure 6:
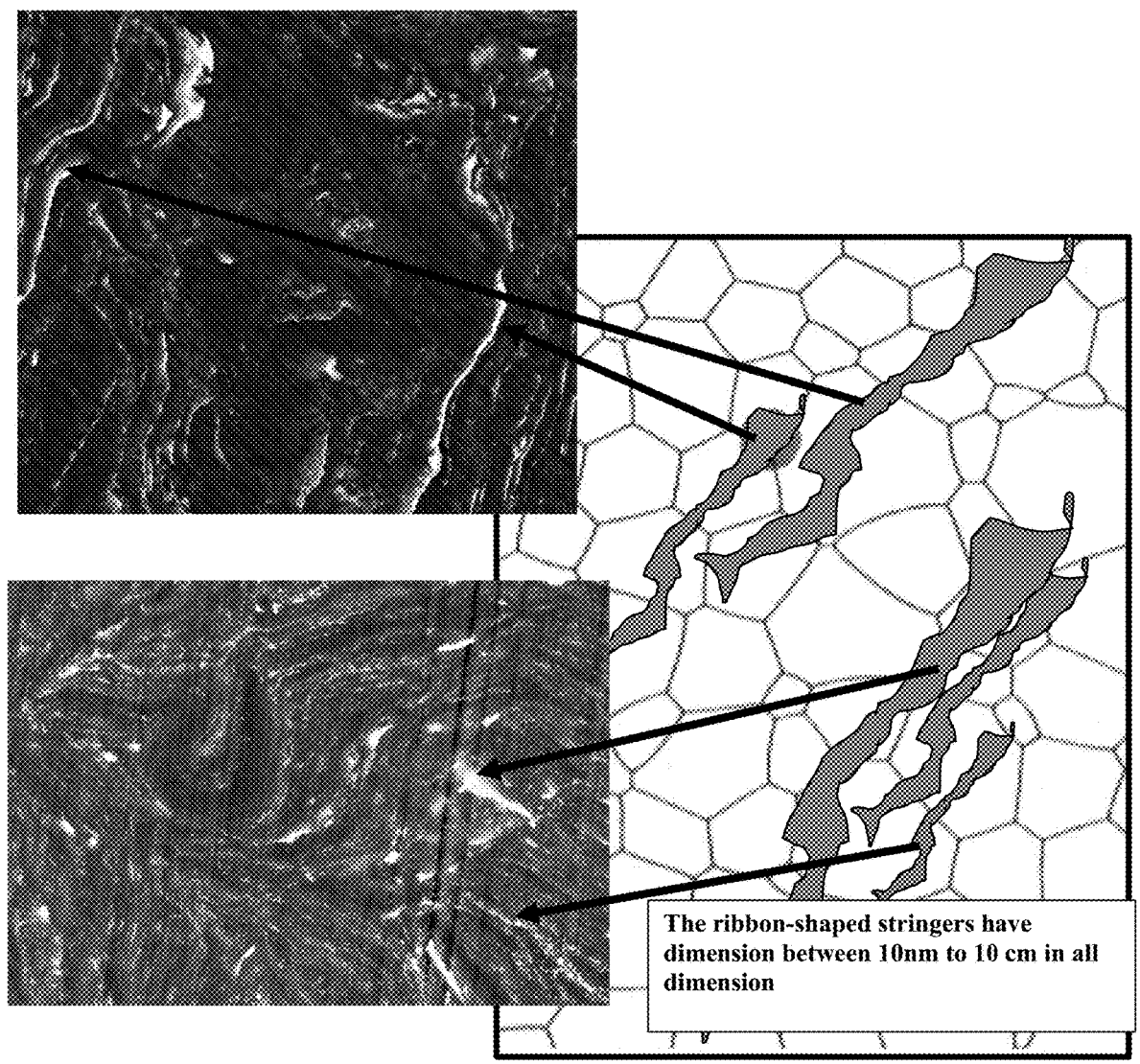
FIG. 6 illustrates existence of ribbon-shaped stringers in an aluminum-tin alloy of the present invention.
Figure 7:
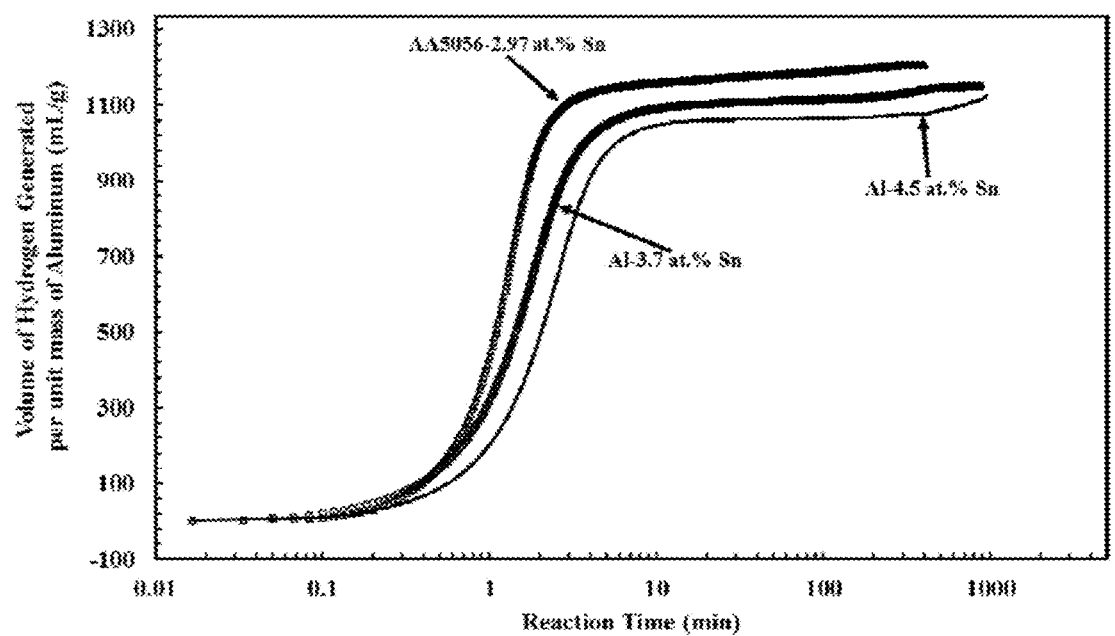
FIG. 7 is a graph illustrating the reaction rate (volume of hydrogen generated per gram of aluminum) for three embodiments of the present invention with water.
Figure 8:
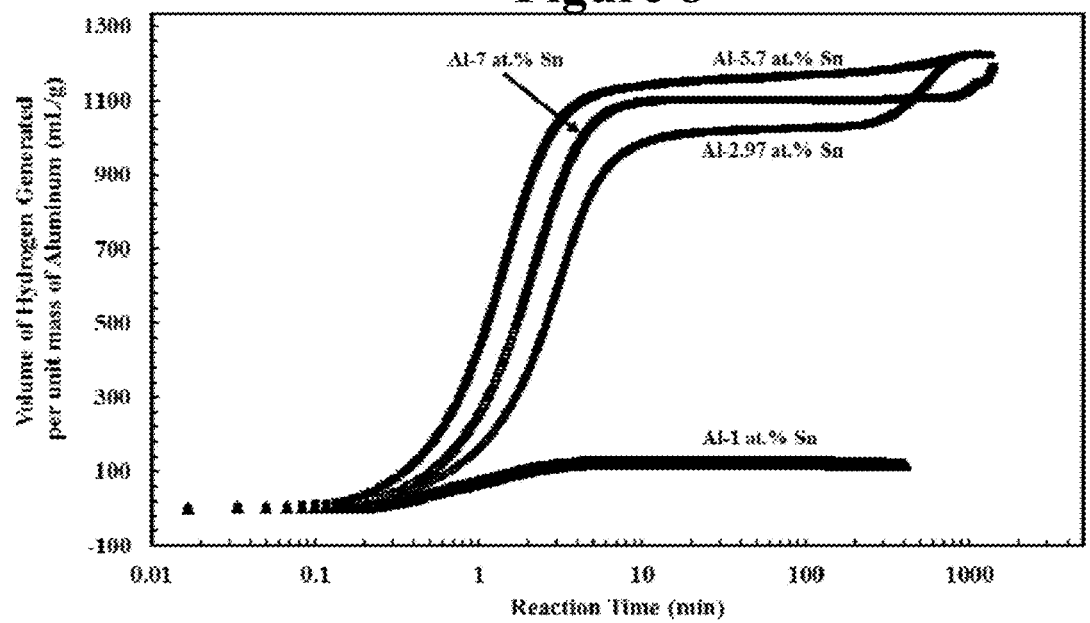
FIG. 8 is a graph illustrating the reaction rate for additional embodiments of the present invention.
Figure 9:
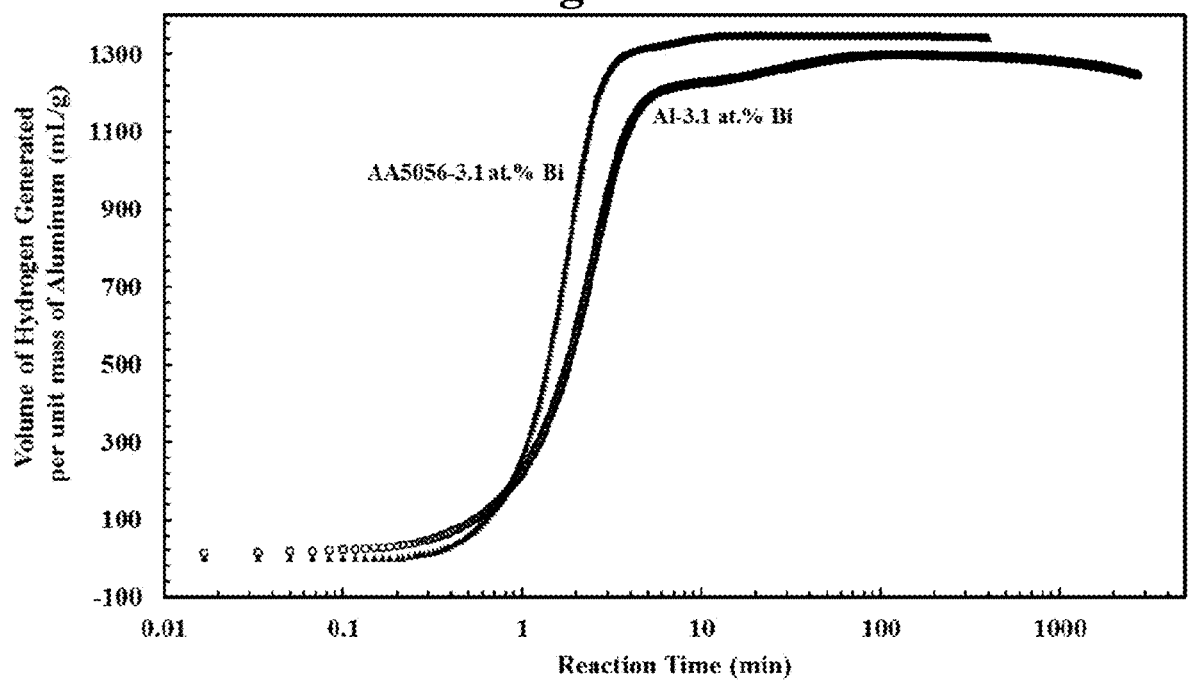
FIG. 9 is a graph illustrating the reaction another two embodiments of the present invention.
Figure 10:
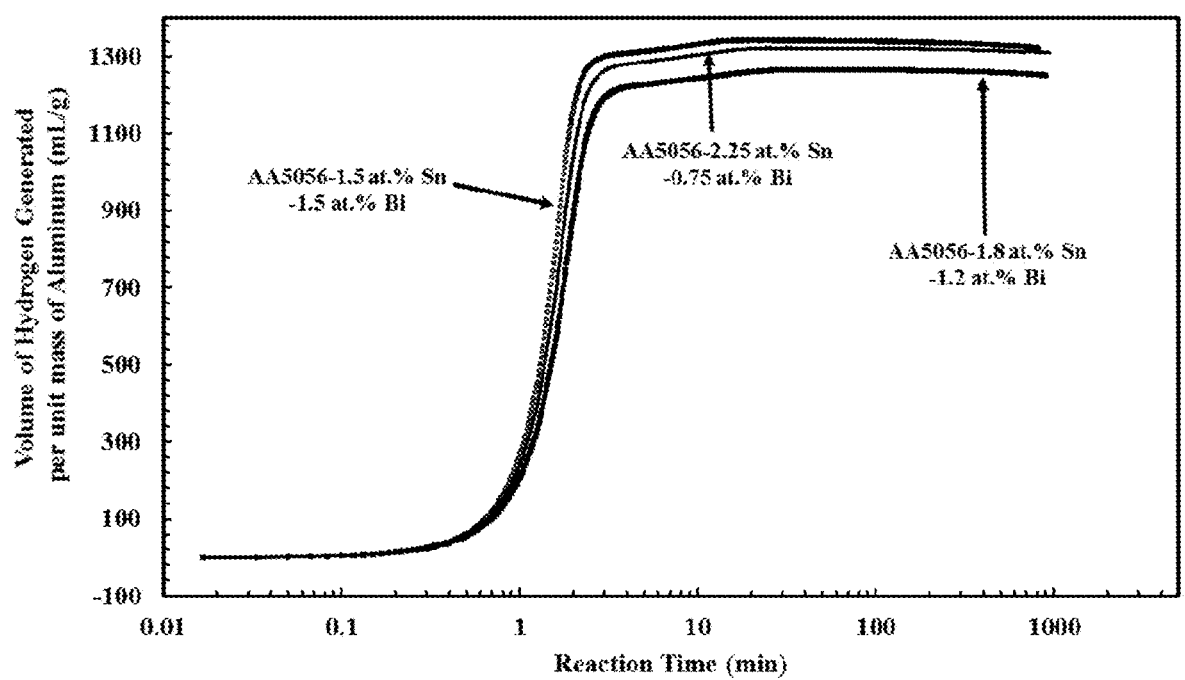
FIG. 10 is a graph illustrating the reaction rate for additional embodiments of the present invention.
Figure 11:
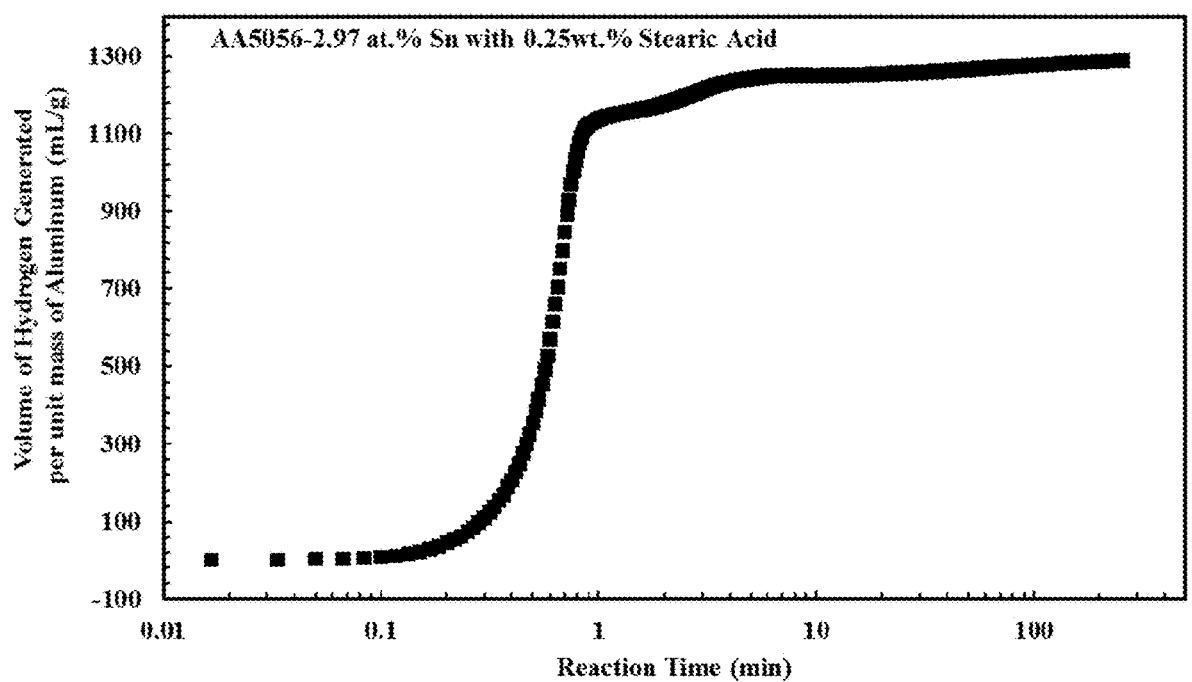
FIG. 11 is a graph illustrating the reaction rate for additional embodiments of the present invention.
Figure 12:
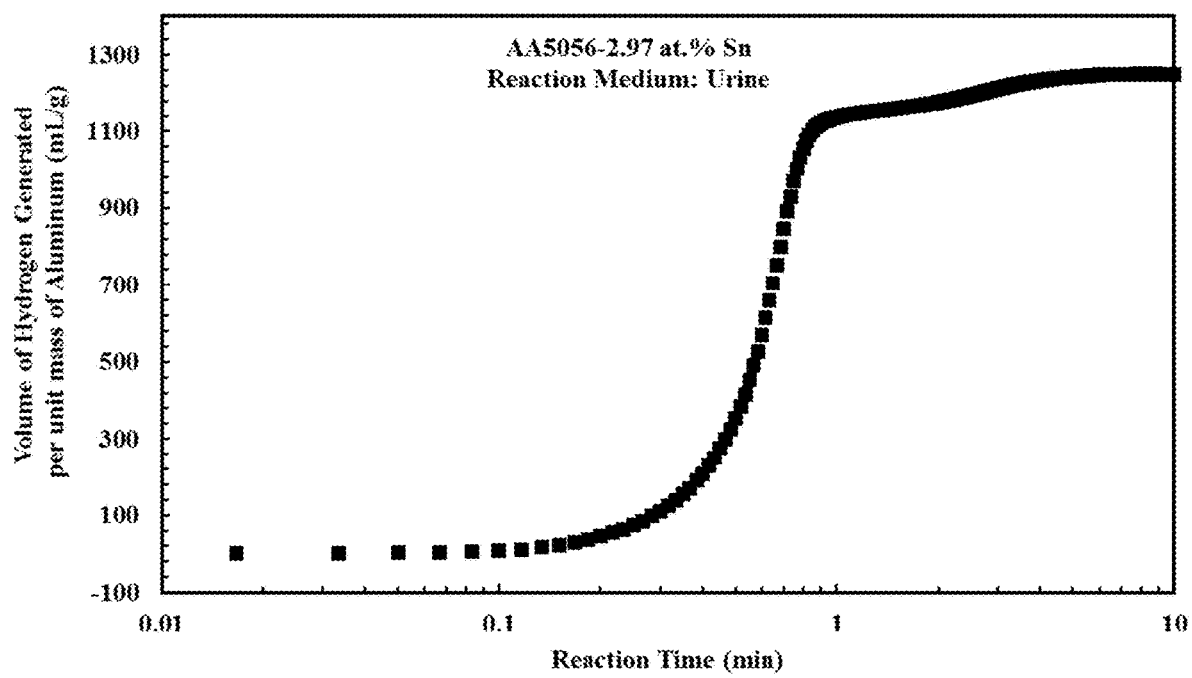
FIG. 12 is a graph illustrating the reaction rate an embodiments of the present invention with urine instead of water.

Particles may be characterized as being small or large based on their size or be ribbon-shaped stringers. Small particles may have diameters typically 2-100 nm. They reside with the grains and/or on the grain boundaries, as further depicted in FIGS. 4 and 5. Large particles reside between the grains of the matrix as further depicted in FIG. 5. The chemistry of these particles will contain the solute metal(s). These larger particles have diameters typically greater than 100 nm and up to 1 mm. The frequency of the appearance of small and large particle will depend on the concentration of the solute metal(s) and the degree of processing. Ribbon-shaped stringers solute particles as depicted in FIG. 6 may have dimension from 10 nm up to 10 mm in all dimension and may have the similar compositions as the aforementioned small and large solute particles.

Figure 13:
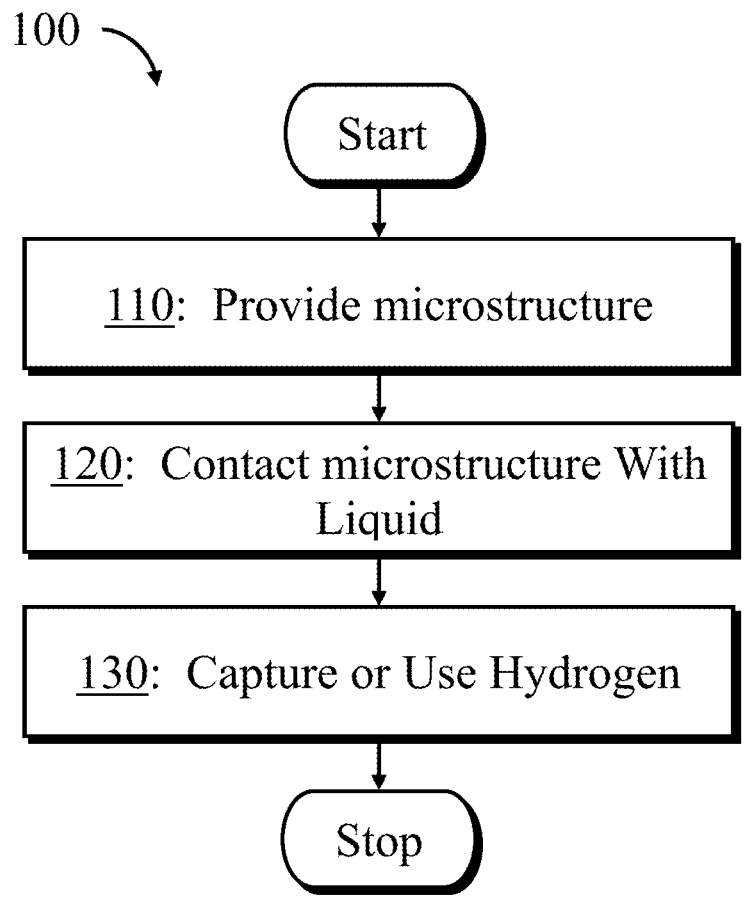
FIG. 13 is a flowchart describing one embodiment for generating hydrogen.
Figure 14:
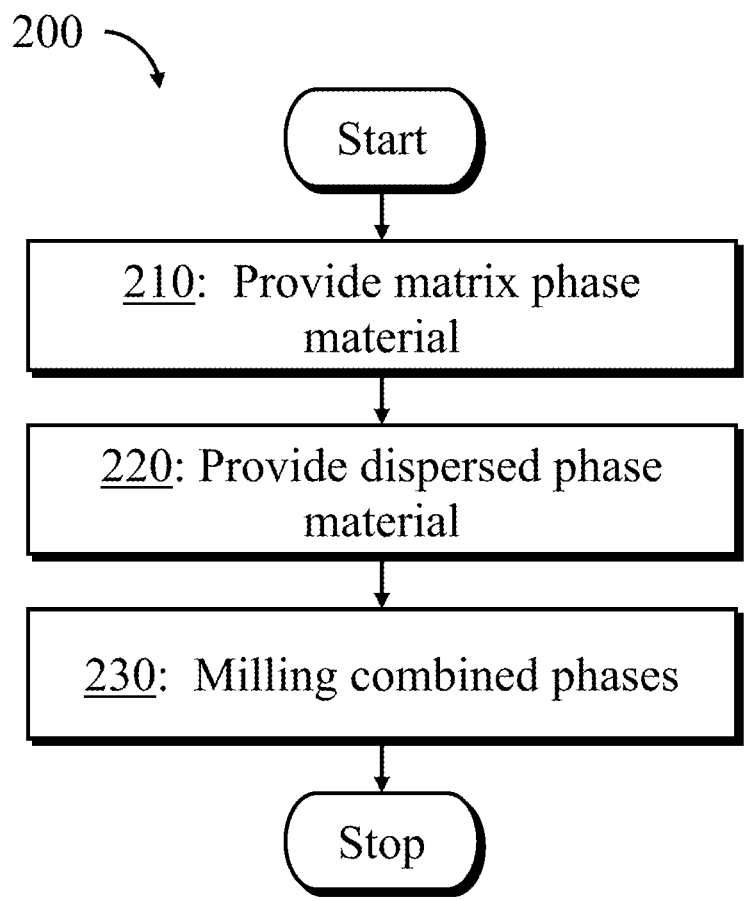
FIG. 14 is a flowchart describing one embodiment for producing a nanogalvanic microstructure.

Some of the examples of the present invention were tested by contacting with water and urine to generate hydrogen gas. Results of the tests are provided in FIGS. 7-12. FIG. 13 provides a flowchart describing a method 100 for generating hydrogen wherein step 110 includes providing a microstructure, step 120 includes contacting the microstructure the microstructure with a liquid, for example water, urine or other water containing liquids and step 130 includes capturing and/or using hydrogen gas that is generated when liquid contacts the composition. And, FIG. 14 provides a flowchart describing a method 200 for producing a nanogalvanic microstructure wherein step wherein step 210 includes providing a matrix phase material, step 220 includes providing a dispersed phase material and step 230 includes milling the combined phases to produce a material that spontaneously generates hydrogen when the material contacts water, urine or another water containing liquid.

The processing techniques that may be used to produce compositions of the present invention may include but are not limited to, milling/machining (including ball milling and especially high energy ball milling), melt spinning, spray atomization, inert gas condensation, solution precipitation, physical vapor deposition, and electrodeposition. Melt spinning forms thin ribbons of material.

Patent documents and other publications mentioned in the specification are indicative of the levels of those skilled in the art to which the invention pertains. These documents and publications are incorporated herein by reference to the same extent as if each individual document or publication was specifically and individually incorporated herein by reference.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A galvanic metal microstructure comprising:
   an anodic matrix comprising aluminum, an aluminum alloy or another aluminum-based composition; and
   a cathodic disperse phase comprising a second metal, second alloy or other second metal-based composition is selected from the group consisting of: tin (Sn), magnesium (Mg), silicon (Si), bismuth (Bi), lead (Pb), gallium (Ga), indium (In), zinc (Zn), and mixtures and alloys thereof
   wherein said cathodic disperse phase comprises small particles of the second metal, second alloy or other second metal-based composition having a particle size, as measured along the longest axis of the particle, from about 2 nm to no more than about 100 nm, and forms galvanic couples with the anodic matrix to produce hydrogen gas when said galvanic metal microstructure contacts with water, a water containing liquid or another electrolyte, wherein, when said galvanic metal microstructure contacts water, a water containing liquid or another electrolyte, it produces at least 1000 mL of $H_2$ gas per gram of aluminum at 25° C. (298 K) and 1 atm. within about 5 minutes.

2. The galvanic metal microstructure of claim 1 wherein the cathodic disperse phase comprises small particles having diameters between 2 nm and 100 nm.

3. The galvanic metal microstructure of claim 1 wherein the cathodic disperse phase also comprises large particles of the second metal, second alloy or other second metal-based composition having a size of about 100 nm to 1 mm.

4. The galvanic metal microstructure of claim 3 wherein the small particles reside within grains of the anodic matrix and the large particles reside between grains of the anodic matrix.

5. The galvanic metal microstructure of claim 1 wherein the cathodic disperse phase also comprises stringers having sizes from about 10 nm to no more about 10 mm in size.

6. The galvanic metal microstructure of claim 1 wherein the galvanic metal microstructure comprises grains having a diameter of no more than about 10 cm.

7. The galvanic metal microstructure of claim 1 wherein the galvanic metal microstructure is not annealed.

8. The galvanic metal microstructure of claim 1 wherein the cathodic disperse phase comprises tin (Sn) or bismuth (Bi).

9. The galvanic metal microstructure of claim 1 wherein the cathodic disperse phase consists essentially of tin (Sn) or an alloy of tin.

10. The galvanic metal microstructure of claim 1 made by melt spinning, spray atomization, inert gas condensation, solution precipitation, physical vapor deposition, or electrodeposition.

11. The galvanic metal microstructure of claim 1 wherein the aluminum alloy is selected from the group consisting of 1000, 2000, 3000, 5000, 6000 and 7000 series aluminum alloys.

12. The galvanic metal microstructure of claim 1, wherein the second metal comprises no more than about 7 at. % of the galvanic metal microstructure.

13. The galvanic metal microstructure of claim 1, wherein, when said galvanic metal microstructure contacts water, a water containing liquid or another electrolyte, it produces at least 1100 mL of $H_2$ gas per gram of aluminum at 25° C. (298 K) and 1 atm. within about 5 minutes.

14. The galvanic metal microstructure of claim 1, wherein, when said galvanic metal microstructure contacts water, a water containing liquid or another electrolyte, it produces at least 1300 mL of $H_2$ gas per gram of aluminum at 25° C. (298 K) and 1 atm. within about 5 minutes.

15. The galvanic metal microstructure of claim 1, wherein the galvanic metal microstructure does not comprise any passivation agent or catalyst.

16. The galvanic metal microstructure of claim 1, wherein the galvanic metal microstructure consists only of metals.

17. A method of generating hydrogen, comprising:
providing a galvanic metal microstructure according to claim 1;
causing a reaction by contacting the galvanic metal microstructure with a liquid comprising at least one hydroxyl group; and
capturing or using spontaneously generated hydrogen.

18. A galvanic metal microstructure comprising:
an anodic matrix comprising aluminum, an aluminum alloy or another aluminum-based composition; and
a cathodic disperse phase comprising a second metal, second alloy or other second metal-based composition is selected from the group consisting of: tin (Sn), bismuth (Bi), lead (Pb), gallium (Ga), indium (In), and mixtures and alloys thereof
wherein said cathodic disperse phase comprises small particles of the second metal having a particle size, as measured along the longest axis of the particle, from about 2 nm to no more than about 100 nm, and forms galvanic couples with the anodic matrix to produce hydrogen gas when said galvanic metal microstructure contacts with water, a water containing liquid or another electrolyte,
wherein, when said galvanic metal microstructure contacts water, a water containing liquid or another electrolyte, it produces at least 1000 mL of $H_2$ gas per gram of aluminum at 25° C. (298 K) and 1 atm. within about 1 minute.

19. The galvanic metal microstructure of claim 18 wherein the aluminum alloy is selected from the group consisting of 1000, 2000, 3000, 5000, 6000 and 7000 series aluminum alloys.

20. The galvanic metal microstructure of claim 19 wherein the second metal, second alloy or other second metal-based composition comprises tin (Sn).

21. The galvanic metal microstructure of claim 18, wherein, when said galvanic metal microstructure contacts water, a water containing liquid or another electrolyte, it produces at least 1100 mL of $H_2$ gas per gram of aluminum at 25° C. (298 K) and 1 atm. within about 1 minutes.

22. A galvanic metal microstructure comprising:
an anodic matrix comprising aluminum, an aluminum alloy or another aluminum-based composition; and
a cathodic disperse phase comprising a second metal, second alloy or other second metal-based composition is selected from the group consisting of: tin (Sn), bismuth (Bi), and mixtures, compositions and alloys thereof, the second metal,
wherein the galvanic metal microstructure does not comprise any passivation agent or catalyst,
the second metal comprises no more than about 7 at. % of the galvanic metal microstructure,
the cathodic disperse phase comprises small particles of the second metal having diameters from about 2 nm to no more than about 100 nm, and forms galvanic couples with the anodic matrix to produce hydrogen gas when said galvanic metal microstructure contacts with water, a water containing liquid or another electrolyte,
the small particles of the cathodic disperse phase reside within grains of the anodic matrix, and
when said galvanic metal microstructure contacts water, a water containing liquid or another electrolyte, it produces at least 1000 mL of $H_2$ gas per gram of aluminum at 25° C. (298 K) and 1 atm. within about 5 minutes.

* * * * *